(12) United States Patent
Sankaralingam et al.

(10) Patent No.: US 9,244,772 B2
(45) Date of Patent: Jan. 26, 2016

(54) COMPUTER PROCESSOR PROVIDING ERROR RECOVERY WITH IDEMPOTENT REGIONS

(75) Inventors: Karthikeyan Sankaralingam, Madison, WI (US); Marc Asher De Kruijf, Madison, WI (US); Chen-Han Ho, Madison, WI (US)

(73) Assignee: National Science Foundation, Arlington, VA (US)

( * ) Notice: Subject to any disclaimer, the term of this patent is extended or adjusted under 35 U.S.C. 154(b) by 672 days.

(21) Appl. No.: 13/100,517

(22) Filed: May 4, 2011

(65) Prior Publication Data

US 2012/0284562 A1 Nov. 8, 2012

(51) Int. Cl.
*G06F 9/30* (2006.01)
*G06F 11/14* (2006.01)
*G06F 9/38* (2006.01)

(52) U.S. Cl.
CPC .......... *G06F 11/1405* (2013.01); *G06F 9/3861* (2013.01)

(58) Field of Classification Search
CPC ............................ G06F 9/3861; G06F 11/1405
USPC ..................................... 712/227, 239; 714/16
See application file for complete search history.

(56) References Cited

U.S. PATENT DOCUMENTS 6,988,183 B1 * 1/2006 Wong .............................. 712/208
2008/0244544 A1 * 10/2008 Neelakantam et al. ........ 717/147

OTHER PUBLICATIONS

Kruijf et al., "The Design, Modeling, and Evaluation of the Relax Architectural Framework", Apr. 2010, University of Wisconsin Madison, Technical Report #1672, pp. 1-30.*
Kim et al., "reference idempotency analysis: a framework for optimizing speculative execution", Jul. 2001, ACM SIGPLAN Notices, vol. 36 Issue 7, pp. 2-11.*
Hennessy et al, "Computer Architecture A Quantitative Approach", 1996, Morgan Kaufmann Publishers, Inc., 2nd ed., p. 273,335.*
Chen, S-K, et al., Compiler-Assisted Multiple Instruction Word Retry for VLIW Architectures, IEEE Transactions on Parallel and Distributed Systems, vol. 12, Issue 12, Dec. 2001, 1293-1304, 12 (12), IEEE Computer Society, Washington, DC, USA.
Li , C-C J., et al., Compiler-Based Multiple Instruction Retry, IEEE Transactions on Computers, vol. 44, Issue 1, 1995, pp. 35-46, IEEE Computer Society, Washinton, DC, USA.
S. Mahlke, et al., Effective Compiler Support for Predicated Execution Using the Hyperblock, Proceedings of the 25$^{th}$ Annual International Symposium on Microarchitecture, 1992, 45-54, IEEE, Piscataway, NJ, USA.
W.-M. W. Hwu, et al., The Superblock: An Effective Technique for VLIW and Superscalar Compilation, The Journal of Supercomputing,—TJS, vol. 7, No. 1-2,, pp. 229-248, 1993, Springer, New York, NY, USA.
S. Melvin, et al. Enhancing Instruction Scheduling with a Block-Structured ISA, International Journal of Parallel Programming, Jun. 1995, vol. 23, Issue 3, pp. 221-243, Kluwer Academic Publisher, Norwell, MA, USA.

(Continued)

*Primary Examiner* — Andrew Caldwell
*Assistant Examiner* — Yuqing Xiao
(74) *Attorney, Agent, or Firm* — Boyle Fredrickson, S.C.

(57) ABSTRACT

A computer architecture allows for simplified recovery after mis-speculation during speculative execution by controlling speculation to occur within idempotent regions that may be recovered by re-execution of the region without the need for restoring complex state information from checkpoints. A compiler for increasing the size of idempotent regions is also disclosed.

16 Claims, 4 Drawing Sheets

(56) References Cited

OTHER PUBLICATIONS

H. Akkary, et al., Checkpoint Processing and Recovery: Towards Scalable Large Instruction Window Processors, MICRO 36, 36$^{th}$ Annual International Symposium on Microarchitecture, 2003, pp. 423-434, IEEE, Piscataway, NJ, USA.

J. Martinez, et al., Cherry: Checkpointed Early Resource Recycling in Out-Of-Order Microprocessors, 35$^{th}$ Annual International Symposium on Microarchitecture, 2002, pp. 3-14, IEEE, Piscataway, NJ, USA.

O. Mutlu, et al. Runahead Execution: An Alternative to Very Large Instruction Windows for Out-Of-Order Processors, HPCA '03 Proceedings of the 9$^{th}$ International Symposium on High Performance Computer Architecture, 2003, pp. 20-25, IEEE Computer Society, Washington, DC, USA.

J. Chang, et al., Automatic instruction-level software-only recovery, International Conference of Dependable Systems and Networks, Jun. 25-28, 2006, pp. 83-92, IEEE, Piscataway, NJ, USA.

Borin, E., et al., Software-Based Transparent and Comprehensive Control-Flow Error Detection, CGO '06 Proceedings of the International Symposium on Code Generation and Optimization, Mar. 26-29, 2006, pp. 1-13; IEEE Computer Society Washington, DC, USA.

Dehnert, J. C., et al., The Transmeta Code Morphing™ Software: Using Speculation, Recovery, and Adaptive Retranslation to Address Real-Life Challenges, CGO '03 Proceedings of the International Symposium on Code Generation and Optimization: Feedback-Directed and Runtime Optimization, Mar. 27-29, 2003, pp. 1-10; IEEE Computer Society Washington, DC, USA.

* cited by examiner

COMPUTER PROCESSOR PROVIDING ERROR RECOVERY WITH IDEMPOTENT REGIONS

STATEMENT REGARDING FEDERALLY SPONSORED RESEARCH OR DEVELOPMENT

This invention was made with government support under 0845751 and 0917238 awarded by the National Science Foundation. The government has certain rights in the invention.

BACKGROUND OF THE INVENTION

The present invention relates to a computer architecture and in particular to an architecture that may recover from faults or errors during the execution of program instructions, for example from speculative execution, and having reduced circuit complexity.

The effective execution speed of computer processors may be increased by "speculative execution" in which computer instructions are executed before the data necessary for that execution is available. An example of speculative execution is branch prediction. In branch prediction, the processor predicts which path of a program branch to take before the data necessary to resolve the branch direction has been fetched or computed. Other types of speculation include value prediction (predicting the value of a variable used by an arithmetic operation before it has been fetched or computed) and load-store dependence prediction (predicting that a variable value will not change from the execution of earlier instructions).

Provided that the prediction inherent in speculative execution is reasonably accurate, idle time of the processor is reduced, and an increased instruction execution rate obtained. Speculation is particularly useful in pipeline architectures which largely require that later instructions be inserted into the pipeline before earlier instructions have exited, even though the later instructions depend on the earlier instructions.

In the event that the speculation is in error (mis-speculation), the speculatively executed instructions must be undone or "squashed" and the execution "recovered". This process is done by returning the processor to the same state it had before execution of the speculative instructions so that the correct instructions can be executed. This squashing process is facilitated by buffering all stores or writes performed by the speculatively executed instructions (which may then be erased in the event of mis-speculation) and flushing the mis-speculated executions from the pipeline. The squashing process relies upon a "checkpoint" created at the beginning of the speculation which accurately records state of the processor in terms of its registers, load store queue, rename table, etc. so that in the event of mis-speculation the speculatively executed instructions may be re-executed as if for the first time.

The circuitry necessary to create and maintain these checkpoints at points of speculation is complex and consumes substantial energy. Some processors having a large number of cores, such as graphic processor units, do not employ speculation at all because of the circuitry overhead.

SUMMARY OF THE INVENTION

The present invention provides a processor that can recover from an erroneous instruction execution, such as occurs during mis-speculation, by simply re-executing a block of constructions including the erroneous instructions without reloading a conventional checkpoint. This is possible by limiting speculation to occur in "idempotent regions" which can be executed repeatedly with the same effect on variables as if executed once.

The ability to recognize and exploit idempotent regions eliminates much of the circuitry and energy consumption required for recovering from mis-speculation or hardware failure. A compiler may be developed which increases the size of idempotent regions within a program.

Specifically, the present invention provides a processor unit having a region detector detecting an idempotent region, being a region of sequentially executed instructions of the program that may be executed multiple times while having the same effect on variables used in the idempotent region and later in the program as if the idempotent region were executed a single time. An execution error detector communicates with the region detector to detect an error in execution of at least one instruction of the idempotent region and a recovery circuit communicates with the execution error detector and responds to an error in the execution of instructions of the idempotent region by restarting execution of instructions in the idempotent region before an instruction of the error without resetting variables used in the idempotent region.

It is thus a feature of at least one embodiment of the invention to permit recovery from instruction errors without the need for complex checkpoint circuitry.

The processor unit may include a speculation circuit for executing instructions in the idempotent region speculatively and the execution error detector may detect mis-speculation in the speculatively executed instructions to indicate an error in the execution of the instructions.

It is thus a feature of at least one embodiment of the invention to provide a simpler method of handling speculation reducing circuit energy consumption and cost. It is a feature of at least one embodiment of the invention to permit speculation in processors that normally would not support speculation circuitry such as graphic processors.

The speculation circuit may be a branch-speculation circuit speculatively executing instructions following a branch condition and the processor unit may further include a stall circuit stalling execution of the program at the end of an identified idempotent region until branch speculation in the idempotent region is complete.

It is thus a feature of at least one embodiment of the invention to prevent transition out of the idempotent region such as might permit overwriting of the data necessary for the idempotent region.

The processor unit may include a write buffer buffering all stores by instructions of the idempotent region until all speculation of instructions relating to the stores is complete.

It is thus a feature of at least one embodiment of the invention to prevent mis-speculative overwriting of regions outside of the idempotent region such as cannot be recovered simply by re-executing the idempotent region.

The speculation circuit may be a memory dependence speculation circuit speculatively executing instructions reading a variable following an instruction writing to the variable. The processor unit may further include a stall circuit stalling execution of the program at the end of an identified idempotent region until memory dependence speculation in the idempotent region is complete.

It is thus a feature of at least one embodiment of the invention to preserve the ability of the memory dependence to be correctly resolved simply by re-executing the idempotent region. Moving out of the idempotent region before this dependence is resolved could result in the overwriting of critical data necessary to this resolution.

The processor unit may include an out-of-order execution circuit for executing instructions out of normal control flow order and a stall circuit stalling execution of the program at the end of an identified idempotent region until all instructions executed out-of-order have been completed.

It is thus a feature of at least one embodiment of the invention to provide a system compatible with out-of-order execution.

The execution error detector may be a hardware fault detector detecting an error or likelihood of error in an execution of at least one instruction from a hardware fault in the processor unit.

It is thus a feature of at least one embodiment of the invention to provide a system equally adept at handling hardware execution errors per sample caused by intermittent thermal or electrical problems likely to increase with advanced processors and smaller device line widths.

The region detector may detect regions by marker instruction inserted into the program.

It is thus a feature of at least one embodiment of the invention to permit compiler-based identification of idempotent regions.

In this regard, the present invention also contemplates a compiler for the above-described processor unit which may review instructions of a program for execution on the processor unit to identify at least two idempotent regions within the program. The compiler may then provide markers of the beginnings and ends of the idempotent regions readable by the processor unit during execution.

It is thus a feature of at least one embodiment of the invention to permit sophisticated analysis of the program for idempotent regions such as may not be possible in run time.

The compiler may further execute to control assignment of variables to memory to increase a contiguous size of at least one idempotent region.

It is thus a feature of at least one embodiment of the invention to employ the compiler to practically enlarge the idempotent regions to increase the effectiveness of the processor unit.

The compiler may identify idempotent regions by analyzing anti-dependencies in which there is a reading of a variable followed by a writing of the variable without a writing of the variable preceding the reading of the variable, and forms idempotent regions by separating regions between instructions performing the reading of the variable and the succeeding writing of the variable.

It is thus a feature of at least one embodiment of the invention to provide a simple method of identifying idempotent regions.

The compiler may further execute prior to forming the idempotent regions to convert the program to static single assignment form to remove artificial anti-dependencies.

It is thus a feature of at least one embodiment of the invention to control register and stack assignments to increase the size of idempotent regions.

The compiler may further execute prior to forming the idempotent regions to perform a redundancy elimination transformation on the program reducing reads of memory locations not controlled by the compiler.

It is thus a feature of at least one embodiment of the invention to refine the anti-dependencies to eliminate those unnecessary for proper program execution.

These particular objects and advantages may apply to only some embodiments falling within the claims and thus do not define the scope of the invention.

DETAILED DESCRIPTION OF THE PREFERRED EMBODIMENT

Figure 1:
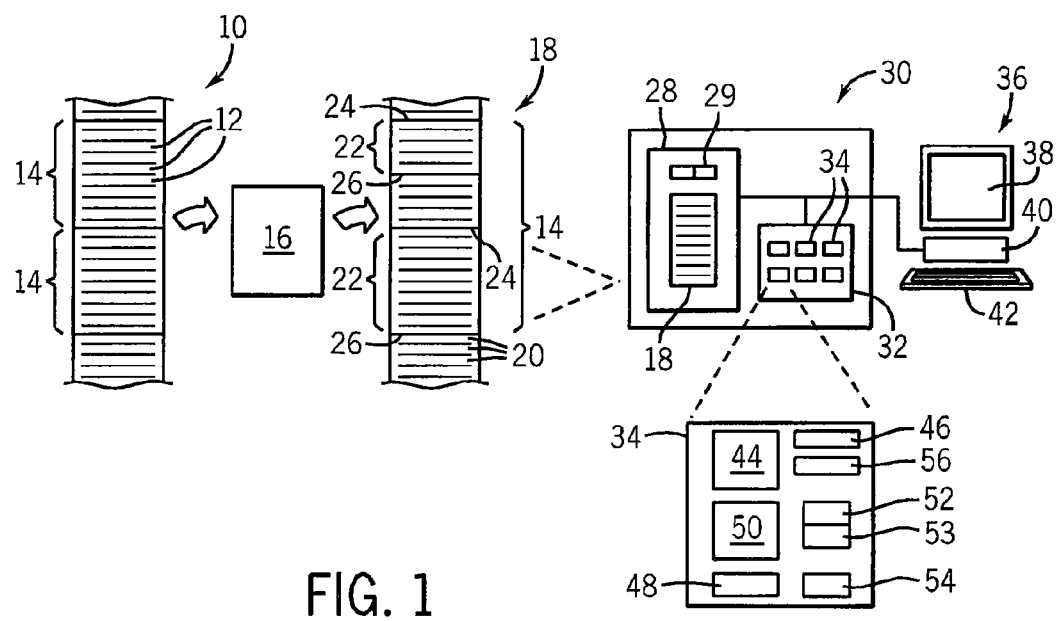
FIG. 1 is a process diagram showing the compilation of a program to increase idempotent regions and the loading of the compiled program into memory of a computer having processors providing elements for fault detection and speculation.

Referring now to FIG. 1, a source code program 10 may include multiple sequentially executed instructions 12 arranged in functions 14 or the like, the functional divisions logically related to a given task performed by the program 10. Such source code programs 10 may be written in a variety of languages including, for example, C and its variants.

The present invention may provide a compiler 16 serving to convert the source code 10 to a compiled program 18 having object instructions 20 of the functions 14 divided into idempotent regions 22. In one embodiment, each idempotent region 22 may be preceded by a region start token 24 and a region conclusion token 26, being specialized instructions providing an indication to the executing processor 34 of the extent of the idempotent regions 22.

As will be discussed in more detail below, each idempotent region 22 consists of a set of instructions 20 that, when executed multiple times (the last time to completion), have the same effects on variables used in the idempotent regions 22 and used later in the compiled program 18 as if the idempotent region 22 were executed a single time. More generally, each idempotent region 22 does not overwrite its live-in variables. The concept of the idempotent region 22 will be described in more detail below.

Referring still to FIG. 1, the compiled program 18 may be loaded into a memory 28 of a computer 30. The memory 28 may also hold various data values 29 and may communicate with a processor system 32 including one or more processors 34 for execution of the compiled program 18. Computer 30 may connect to external devices, for example, a programming terminal 36 providing: display 38 for the display of information, a separate processor 40, and user input devices 42 such as a keyboard or mouse.

Referring still to FIG. 1, each processor 34 may include an arithmetic logic unit 44 with or without a pipeline (not shown) and including various registers 46 including a program counter 48 as well as standard operating and flag registers. The processors 34 may also include speculation circuitry 50 including elements such as predictors and the like according to techniques known in the art but excluding standard checkpoint circuitry used for squashing mis-speculated instructions. The processors 34 may also include out-of-order execution circuitry 52 allowing instructions to be executed out of their program order by the arithmetic logic unit 44 according to techniques known in the art but excluding a reorder buffer. The processors 34 may also include output write buffers 53 holding values to be output by instructions that are being speculatively executed until completion of that execution.

The processor 34 may also provide for error state circuitry 54 for detecting error states in the operation of the processor 34 representing likely errors by the processor 34. For example, the error state detecting circuitry 54 may detect under-voltage, over-temperature, clock frequency perturbations or the like which suggests temporary error conditions by the processor 34, or may check calculation results using hardware error checking systems such as parity checking circuits, watchdog timers or the like. Generally, the error state circuitry 54 will detect a "mis-execution" of one or more instructions, the mis-execution indicating a probable error in program execution that is detected either directly or indirectly by detection of an underlying fault. Mis-execution should be understood to broadly cover conditions likely to lead to erroneous execution of the program for any reason.

Significantly, the present invention includes simple idempotency processing circuitry 56 as will be described below which executes firmware whose operation will be discussed below with respect to FIG. 7. As noted above, the processor 34 may exclude checkpoint storage circuitry (for example, a restore stack) for handling mis-speculations or a reorder buffer (ROB) normally required for out-of-order processing, or a load-store queue (LSQ) normally associated with memory dependence prediction.

Generally, the invention operates to identify idempotent regions 22 and to permit speculation during those regions or simple recovery from hardware errors. In the event of mis-speculation or hardware errors, the program counter is simply restored to a point before the mis-speculation (typically the beginning of the idempotent region 22) without the need to restore a state checkpoint.

Figure 2:
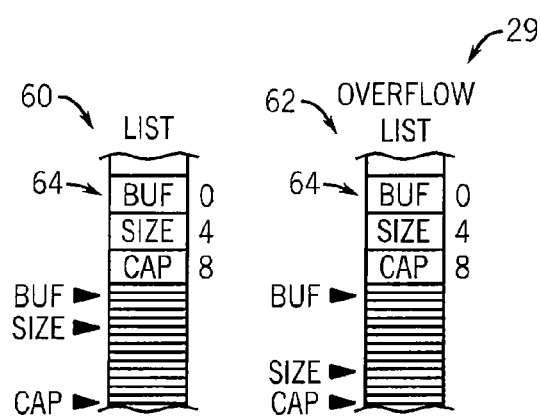
FIG. 2 is a representation of data structures of a list and overflow list used in an example program explaining idempotent regions and the compilation process.

Referring now to FIG. 2, the concept of the idempotent region 22 may be demonstrated in a simple program that adds elements to a "list" 60 or if that list is full, to an "overflow list" 62 each represented by a data structure in memory. Each data structure of the list 60 and overflow list 62 may include a starting address 64 in memory 28 and, at known offsets of 0, 4 and 8 memory words, variables holding a pointer to the address of the beginning of the list (BUF), an index pointing to the last filled item in the list (SIZE) indicating the list's current size, and the address of the end of the list (CAP) indicating the list's maximum capacity. As elements are added to the list (or overflow list) the SIZE variable is incremented until it reaches the value of the CAP variable at which time an overflow condition occurs and new elements are added to the overflow list 62 instead of the list 60.

Figure 3:
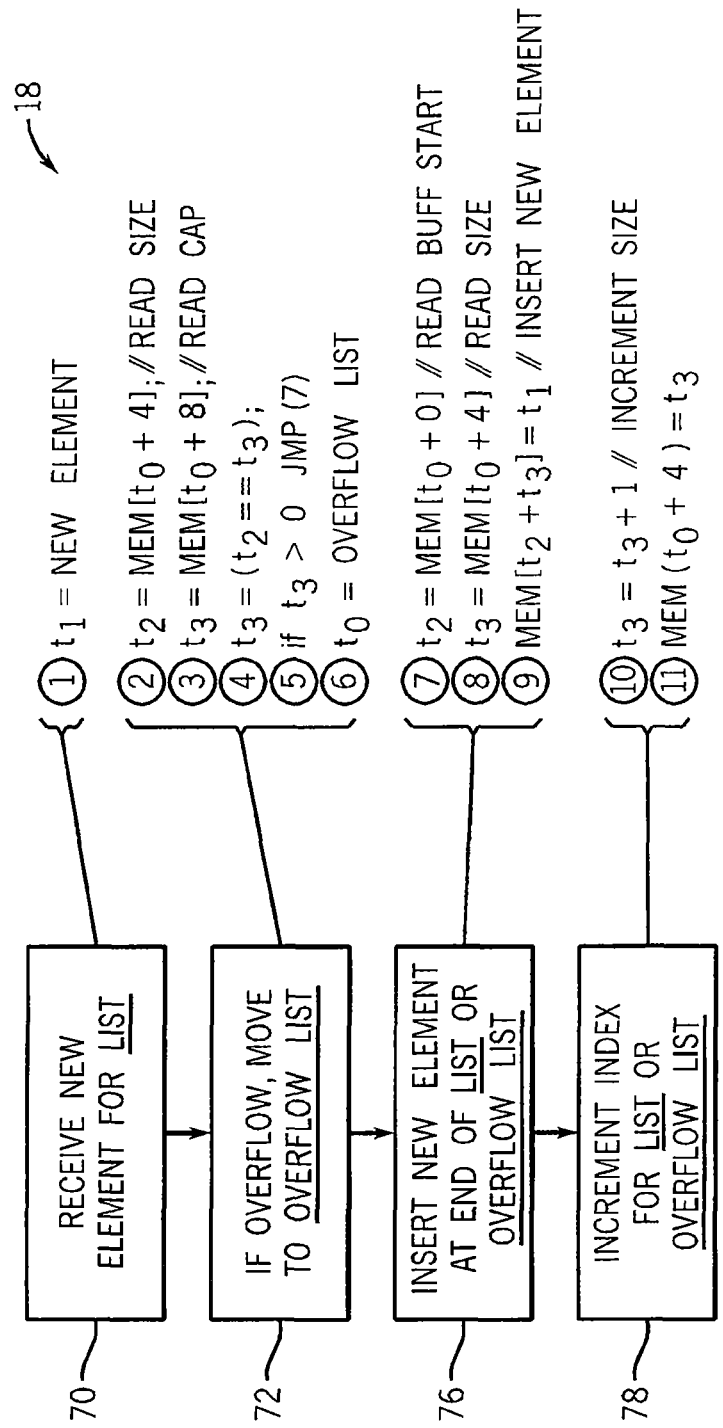
FIG. 3 is a flow chart of the program using the data structures of FIG. 2 and showing simplified machine code for implementing those instructions.

Referring now also to FIG. 3, the process of adding an element to the list 60 may be implemented as a function 14 as shown in FIG. 1 and may begin as indicated by process block 70 with receipt of the new element for the list. This step may be represented in compiled program 18 (depicted as assembly language instructions for clarity) in which at line 1 a temporary register $t_1$ receives the value of the new element to be added.

At next process block 72, the list 60 is examined to see if adding a new element would cause an overflow. This process (at line 2) loads into a second register $t_2$ the value of SIZE held at the memory address of $[t_0+4]$ and (at line 3) loads into third register $t_3$ the value of CAP held at the memory address of $[t_0+8]$. These operations require a memory read to a value of the register $t_0$ previously loaded with the starting address 64 of the list buffer (not shown) added to the necessary offset of 4 or 8.

At line 4, register $t_3$ is set to 1 if SIZE equals CAP indicating that the list is full. If at line 5, register $t_3$ has a value of 1 indicating that the list is full, then the address in $t_0$ is changed from the address of the list 60 to the address of the overflow list 62 so that all subsequent operations will affect the overflow list 62 rather than the list 60.

At process block 76, the new element is inserted at the end of the list or of the overflow list depending on the result of line 5. This process loads the values of BUF (at the memory address of $[t_0+0]$) and SIZE (at the memory address of $[t_0+4]$) from either the list 60 or overflow list 62 into registers $t_2$ and $t_3$ respectively (at lines 7 and 8, and adds these values together to load the value of register $t_1$ (holding the new element) into the memory location $[t_2+t_3]$ pointed to by the sum of BUF and SIZE at line 9

At process box 78, the value of SIZE is incremented (in either the list 60 or overflow list 62 as is appropriate) by adding one to register $t_3$ at line 9 and loading this register into the SIZE field at the memory address of $[t_0+4]$ of the list 60 or overflow list 62.

The compiled program 18 is not idempotent because the process of incrementing the SIZE variable changes the SIZE variable by one after each execution of the compiled program 18. For this reason, multiple executions of the program will not provide the same results as the first execution of the program. The present invention provides a method of identifying portions of programs that are idempotent and compiling the programs 10 to maximize the continuous idempotent regions in the compiled program 18.

Figure 5:
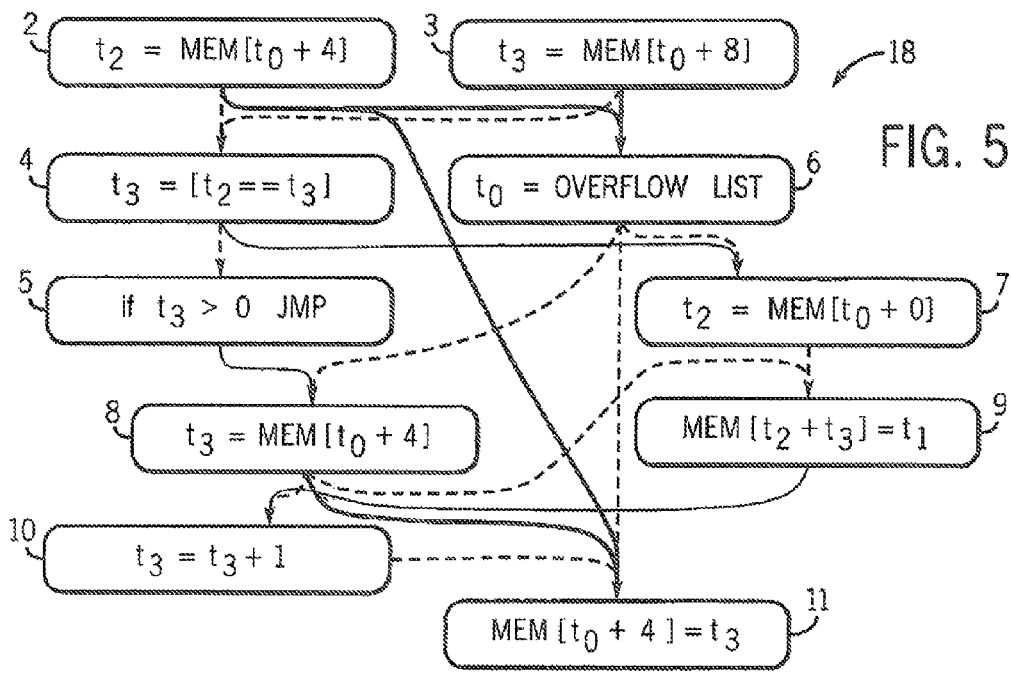
FIG. 5 is a control flow diagram of the instructions of FIG. 3 showing clobber anti-dependencies that prevent a region from being idempotent.

Referring now to FIG. 5, the control flow of the program of FIG. 3 is depicted so as to illustrate relationships between the instructions that may affect whether a particular program is idempotent. In FIG. 5, general "flow" dependencies between instructions are shown by dotted lines, "anti-dependencies", as will be described, are shown by solid lines. Within the anti-dependencies, "clobber" anti-dependencies are shown in a thick solid line and anti-dependencies that are not clobber anti-dependencies are shown with a thin solid line. These distinctions are used to identify contiguous idempotent regions and further to manipulate the compilation of the program to maximize the size of contiguous idempotent regions. Contiguous in this context refers to the execution sequence of the instructions rather than their place in the program or in computer memory. In summary, idempotent regions 22 are formed by collecting instructions that do not include both instructions on either side of a clobber anti-dependency.

Continuing to refer to FIG. 5, flow dependencies are read-after-write data dependencies in which a first instruction writes to a data value and then is followed by a second instruction that reads from the same data value. Flow dependencies generally do not create a problem for idempotency because on repetition of the flow dependency instructions, the first write instruction returns the program to an identical state for each subsequent execution.

Anti-dependencies, in contrast, are "write-after-read" dependencies in which an instruction that reads a variable is followed by an instruction that writes the same variable. It will be understood that this second writing of the variable can create a problem for idempotency because it changes the variable so if the instructions including the dependency bar are repeated, that variable will have a changed value.

Not all anti-dependencies destroy idempotency. If an anti-dependency is preceded by a writing of the variable at issue then, like a flow dependency, re-executing the program restores the program to its initial state of that first writing. This preceding write permits idempotency even with a following anti-dependency.

If the anti-dependency is not preceded by a writing of the variable (a flow dependency), it will be termed a "clobber"

anti-dependency which is generally fatal to idempotency. Thus, regions of idempotent may be defined in terms of the presence or absence of clobber anti-dependencies. The following chart summarizes this general principle:

| Operation Sequence | Dependency Type | Idempotent? |
|---|---|---|
| Write x, Read x | Flow Dependency | Yes |
| Write x, Read x, Write x | Anti-Dependency | Yes |
| Read x, Write x | Clobber Anti-Dependency | No |

Referring again to FIG. 5, it can be seen that instruction 4 is flow dependent on instruction 3 because instruction 3 writes to register $t_3$ before that register is read at instruction 4. Similarly, instruction 6 is clobber anti-dependent on instruction 2 because instruction 6 reads register $t_0$ then writes to register $t_0$ without there having been a writing to register $t_0$ before instruction 2. Finally, instruction 7 is anti-dependent on instruction 4 (but not clobber anti-dependent) because there is a writing after a reading of register $t_2$ but there has been a previous writing to register $t_2$ at instruction 2. It will be seen in FIG. 5 that there are clobber anti-dependencies between the following instruction pairs: 2-6, 3-6, 2-11, and 8-11.

While the invention may be implemented simply by identifying idempotent regions as those not containing any clobber anti-dependencies, it is possible to reduce the number of clobber anti-dependencies by certain compiler techniques. Generally, clobber anti-dependencies that may be eliminated by compilation will be termed "artificial" clobber anti-dependencies, whereas clobber anti-dependencies that are inherent in the program function will be termed "semantic" clobber anti-dependencies.

Whether a anti-dependency is semantic depends on the storage location of the relevant variable as within either (1) program controlled memory (global memory or heap memory) or (2) compiler controlled memory (registers and stack). Generally, memory anti-dependencies related to variables stored in compiler-controlled memory will be "artificial" and can be removed by compilation techniques. These distinctions are summarized below:

| Dependent variable type | Dependent variable location | Clobber anti-dependency type | Can be eliminated by compiler? |
|---|---|---|---|
| Memory anti-dependency | Memory | Semantic | No |
| | Heap | Semantic | No |
| | Stack | Artificial | Yes |
| | Register | Artificial | Yes (Mostly) |

Figure 4:
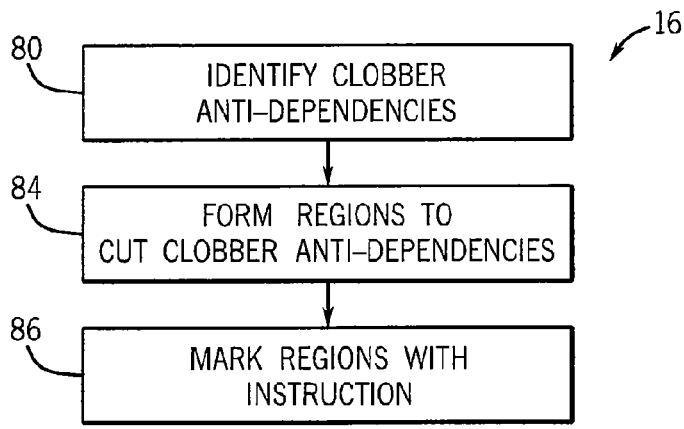
FIG. 4 is a flow chart of steps of a compiler identifying regions of idempotency.
Figure 6:
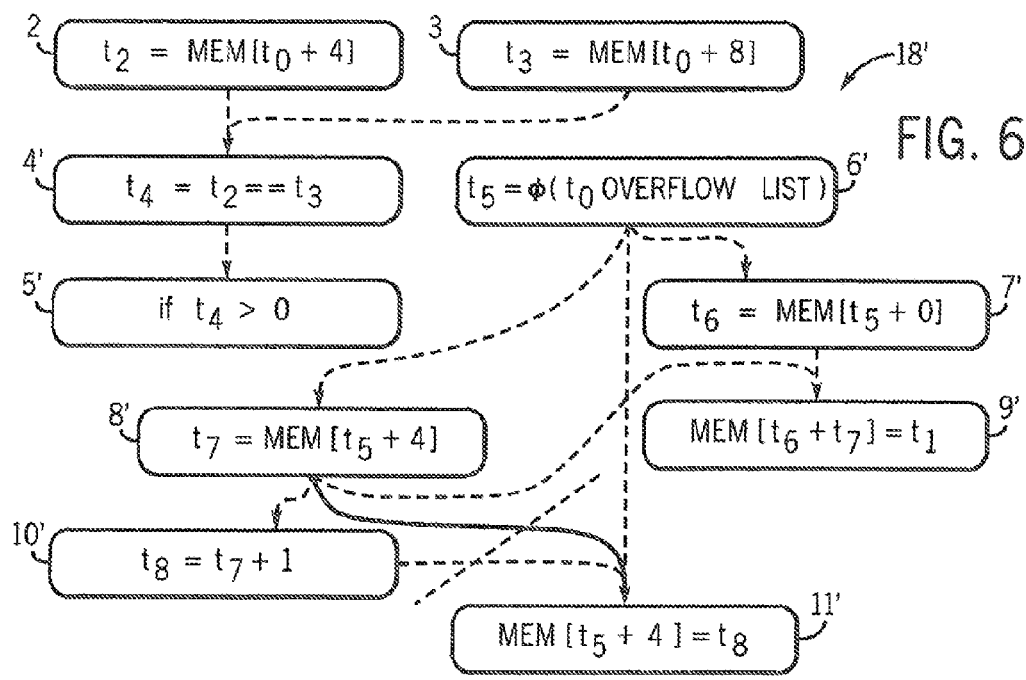
FIG. 6 is control flow diagram similar to that of FIG. 5 compiled to increase the size of idempotent regions.

Referring now to FIG. 6, the clobber anti-dependencies between instructions 2-11, 3-6 and 2-6 can be eliminated by reassigning memory controlled by the compiler (e.g. registers) at instructions 5', 7', 8', 9' and 10' and the use of a φ-function at instruction 6'. As will be understood in art, a φ-function defectively chooses a value ($t_0$ or overflow list) depending on the control flow. This reassignment of register values leaves only a single clobber anti-dependency between instructions 8' and 11' (being the equivalent of instructions 8 and 11 with adjusted registers). An idempotent region 22 may thus be developed by simply dividing the compiled program 18 at idempotency region boundary 82 between instruction 10' and 11' per process block 84 of FIG. 4. This division ensures that the input variables to the compiled program 18' are not modified in the region before the idempotency region boundary 82 which remains idempotent.

Referring again to FIG. 4, at process block 86 demarcating instructions or the like may be placed on the idempotent regions to show the idempotency region boundary 82.

Generally, the process described above may be implemented in the compiler 16 by converting all of the register assignments in the uncompiled code 10 to a static single assignment form (SSA) as is understood in the art and specifying that all live-in variables in the region 22 be maintained live regardless of the use of those live-in variables. This will produce a compiled program 18' free of artificial anti-dependencies meaning that the remaining anti-dependencies are semantic. This will not determine whether the remaining anti-dependencies which are semantics are clobber anti-dependencies, but will permit the identification of idempotent regions 22 that are arguably sub optimal simply by observing the remaining anti-dependencies and breaking idempotent regions between the instructions of the remaining anti-dependencies.

An improved demarcation of idempotent regions 22 can be obtained through the use of a redundancy eliminating transformation which eliminates some remaining artificial anti-dependencies increasing the likelihood that any remaining memory anti-dependencies are clobber anti-dependencies. An example of this transformation is shown below and results in the elimination of an anti-dependency that is artificial.

| Before transformation | After transformation |
|---|---|
| 1. mem[x] = a | 1. mem[x] = a |
| 2. b = mem[x] | 2. b = a |
| 3. mem[x] = c | 3. mem[x] = c |

This transformation reduces unnecessary reads of memory locations not controlled by the compiler and can be implemented by techniques well understood in the art.

As noted, the redundancy eliminating transformation increases the likelihood that any remaining anti-dependencies are clobber anti-dependencies. After this transformation it may be assumed that the remaining memory anti-dependencies are either clobber anti-dependencies or indistinguishable from clobber anti-dependencies.

As noted, after these transformations, the idempotent regions are produced by cutting all semantic clobber anti-dependencies (separating the instructions forming the clobber anti-dependencies into different idempotent regions) to form boundaries between idempotent regions. This cutting process may be implemented to maximize the idempotent regions by casting the problem in terms of the NP-complete vertex multi-cut problem and using approximation algorithms to define the minimum set of cuts or by other similar techniques.

Figure 7:
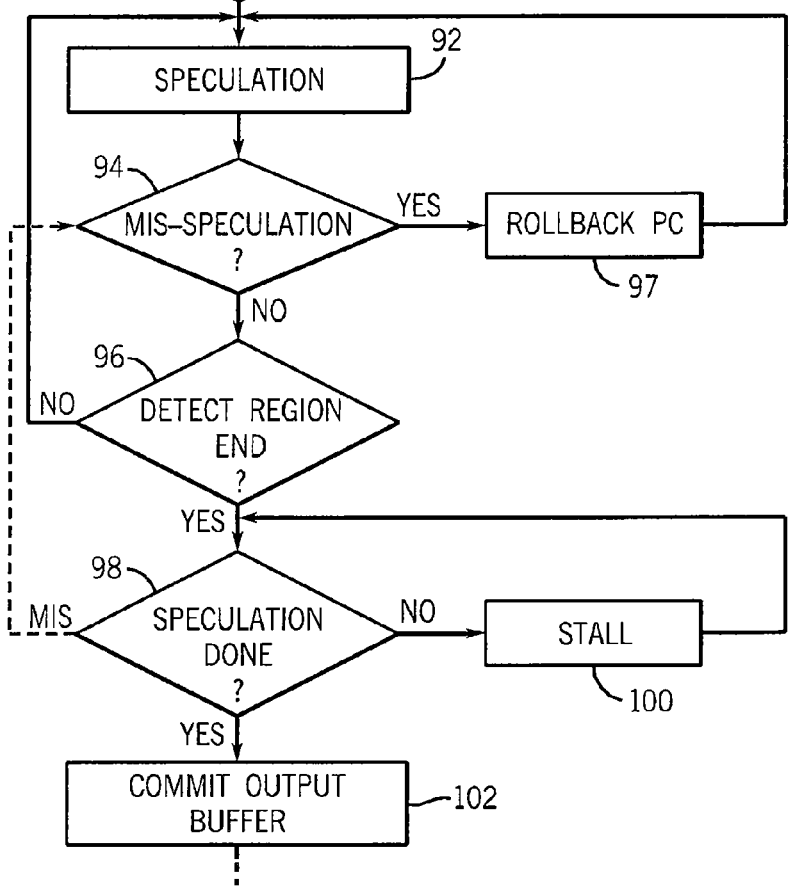
FIG. 7 is a flow chart showing execution of the compiled program by the processor of FIG. 1.

Referring now to FIGS. 1 and 7, the compiled program 18 may be executed by the processor 34 using rules implemented in the idempotency processing circuitry 56. Following the steps of these rules, at decision block 90, the beginning of an idempotent region 22 may be detected and the value of the program counter 48 stored. This detection may be by means of the special instruction embedded in the compiled program 18 by the compiler 16 or by a table of addresses or other similar mechanisms prepared by the compiler.

Speculative execution of instructions and out-of-order instruction execution may be performed during execution of the instructions of the idempotent region 22 as indicated by process block 92.

In the event of a mis-speculation or hardware error, as detected at decision block 94, such as may render the executed portion of the idempotent region 22 erroneous or suspect, the erroneous or suspect portion of the idempotent region 22 may simply be re-executed by rolling back the value of the program counter 48 per process block 97 to that value stored at decision block 90.

Decision block 96 detects the end of the idempotent region 22 and at that time halts further speculation and proceeds to decision block 98 where the current speculation is assessed to see if it is complete. Generally, the speculation is complete if the variables subject to speculation have been fetched and determined to match the values used for the speculation (in branch and value speculation) or a determination has been made that a dependency did not exist (in memory dependence speculation). If not, the program stalls at process block 100 until the speculation is complete and until all out-of-order instructions have been retired, or branches to decision block 94 if the completion indicates a mis-speculation.

If the speculation has successfully completed, then at process block 102, any optional output buffer holding outputs from the speculation is committed (by writing these output values to memory) and the processor 34 proceeds for further execution of the program after the idempotent region 22 (without speculation) until the detection of a new idempotent region at decision block 90 again.

Generally, the idempotency processing circuitry 56 enforces the following rules: A.

A. Execution may not proceed across an idempotent region boundary until all outstanding speculation has been verified; and B. For all instructions that write to memory locations that are not compiler controlled such as the heap or global memory, (1) the memory location of the write must be verified correct and either (2a) the write must be reached through correct control flow inside the containing idempotent region, or (2b) the write must be buffered until the containing region terminates successfully as described above with respect to process block 102.

This first condition results from the fact that mis-speculation may not be recovered, using the present invention's use of idempotent regions, after the boundary of idempotent region.

The second requirement arises from the need to ensure that program semantics are observed. Memory not controlled by the program (e.g. memory other than registers and stack memory) is thus protected by buffering stores to the memory until it is verified that the write destinations and control flow is correct. Other approaches such as modifying the idempotent region to ensure this condition is statically guaranteed are also possible.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The terms "hardware fault" or "hardware error" refer generally to faults in the execution of a program by the computer and their effect on architecture state caused by hardware operation, as opposed to software design, whether as a result of component failure, over temperature, electromagnetic interference, supply voltage interruptions or noise, or high-energy particle interference, or the like.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A processor unit for an electronic computer executing instructions of a program, the processor unit comprising:

a region detector detecting an idempotent region during execution of the instructions being a region of sequentially executed instructions of the program that may be executed multiple times while having a same effect on variables used in the idempotent region and later in the program as if the idempotent region were executed a single time;

an execution error detector communicating with the region detector to detect a mis-speculation of at least one instruction of the idempotent region;

a recovery circuit communicating with the execution error detector and responding to the mis-speculation by restarting execution of instructions in the idempotent region without restoring variables from an earlier variable checkpoint; and a speculation circuit for executing instructions in the idempotent region speculatively before data necessary for the execution is available and wherein the execution error detector detects mis-speculation in the speculatively executed instructions in the absence of a hardware fault in the operating processing unit to indicate the mis-speculation and to trigger the recovery circuit;

wherein the processor unit does not include variable checkpoint storage circuitry for restoring variable values after mis-speculation.

2. The processor unit of claim 1 wherein the speculation circuit is a branch-speculation circuit speculatively executing instructions following a branch condition; and further including a stall circuit stalling execution of the program at an end of an identified idempotent region until branch speculation in the idempotent region is complete.

3. The processor unit of claim 2 further including a write buffer buffering all stores by instructions of the idempotent region until all speculation of instructions relating to the stores is complete.

4. The processor unit of claim 1 wherein the speculation circuit is a memory dependence speculation circuit speculatively executing instructions reading a variable following an instruction writing to the variable; and further including a stall circuit stalling execution of the program at the end of an identified idempotent region until memory dependence speculation in the idempotent region is complete.

5. The processor unit of claim 1 wherein the speculation circuit is an out-of-order execution circuit for executing instructions out of normal control flow order; and further including a stall circuit stalling execution of the program at an end of an identified idempotent region until all instructions executed out-of-order have been completed; and wherein the processor does not include a reorder buffer.

6. The processor unit of claim 1 wherein the region detector detects regions by marker instructions inserted into the program.

7. A compiler for a processor unit executing a program, the processor unit being of a type including:

a region detector detecting an idempotent region according to a marking of the regions, each idempotent region being a region of sequentially executed instructions of the program that may be executed multiple times while having a same effect on variables used in the idempotent region and later in the program as if the idempotent region were executed a single time;

an execution error detector communicating with the region detector to detect a mis-speculation of at least one instruction of the idempotent region; and a recovery circuit communicating with the execution error detector and responding to the mis-speculation by restarting execution of instructions in the idempotent region;

the compiler comprising:

a program embodied in a non-transitory computer-readable medium and executing on a computer to:

(a) review instructions of a program for execution on the processor unit to identify at least two idempotent regions within the program based on an analysis of dependencies of the instructions of the program; and (b) based on the review, provide markers of beginnings and ends of the idempotent regions readable by the processor unit during execution indicating that the idempotent region is idempotent;

wherein the compiler further executes to control assignment of variables to memory to increase a contiguous size of at least one idempotent region; and wherein the compiler further executes to identify idempotent regions by analyzing clobber anti-dependencies which occur only in states in which there is a reading of a variable followed by a writing of the variable without a writing of the variable preceding the reading of the variable, and forms idempotent regions by separating regions between instructions performing the reading of the variable and the succeeding writing of the variable.

8. The compiler of claim 7 wherein the compiler further executes prior to forming the idempotent regions to convert the program to a static single assignment form to remove artificial anti-dependencies.

9. The compiler of claim 7 wherein the compiler further executes prior to forming the idempotent regions to perform a redundancy elimination transformation on the program reducing reads of memory locations not controlled by the compiler.

10. A method of executing a program including instructions on an electronic computer, the method comprising the steps of;

(a) using at least one electronic computer to identify an idempotent region in the program being a region of sequentially executed instructions of the program that may be executed multiple times while having a same effect on variables used in the idempotent region and later in the program as if the idempotent region were executed a single time by an analysis of dependencies of the instructions of the program;

(b) detecting a mis-speculation of at least one instruction of the idempotent region based on the identification of step (a); and (c) responding to the mis-speculation by restarting execution of instructions in the idempotent region without loading variables from a variable checkpoint storage circuit;

wherein the mis-speculation is an error within the idempotent region in speculative execution of at least one instruction before data necessary for the execution of the at least one instruction is available in the absence of a hardware fault in the electronic computer.

11. The method of claim 10 wherein the speculation is a branch-speculation speculatively executing instructions following a branch condition and further including the step of stalling execution of the program at the end of an identified idempotent region until branch speculation in the idempotent region is complete.

12. The method of claim 11 further including the step of buffering all stores by instructions of the idempotent region until all speculation of instructions relating to the stores is complete.

13. The method of claim 10 wherein the speculation is a memory dependence speculation circuit speculatively executing instructions using a variable following an instruction writing to the variable and further including the step of stalling execution of the program at the end of an identified idempotent region until memory dependence speculation in the idempotent region is complete.

14. The method of claim 10 further including the step of executing instructions out of normal control flow order; and further including the step of stalling execution of the program at the end of an identified idempotent region until all instructions executed out-of-order have been completed.

15. A computer system comprising:

an electronic computer executing a program stored in non-transitory medium to:

identify an idempotent region being a region of sequentially executed instructions of the program that may be executed multiple times while having a same effect on variables used in the idempotent region and later in the program as if the idempotent region were executed a single time;

wherein the identification of a given idempotent region analyzes dependencies between instructions and locates ending boundaries of a given idempotent region so that the boundaries separate an earlier and later instruction related in a clobber anti-dependency, wherein the earlier and later instruction are related in a clobber anti-dependency only when the earlier instruction in the given idempotent region reads a given memory variable and the later instruction writes the given memory variable and the earlier instruction is not preceded by another instruction in the given idempotent region that writes the given memory variable.

16. A processor unit for an electronic computer executing instructions of a program, the processor unit comprising:

a region detector detecting an idempotent region being a region of sequentially executed instructions of the program that may be executed multiple times while having a same effect on variables used in the idempotent region and later in the program as if the idempotent region were executed a single time;

a speculation circuit permitting speculation only in idempotent regions and detecting a mis-speculation of at least one instruction of the idempotent region; and a recovery circuit communicating with the execution error detector and responding to the mis-speculation in the absence of a hardware fault in the electronic computer by restarting execution of instructions in the idempotent region.

* * * * *